US009391837B2

(12) United States Patent
Wu et al.

(10) Patent No.: US 9,391,837 B2
(45) Date of Patent: Jul. 12, 2016

(54) METHOD, PROXY DEVICE, AND SYSTEM FOR MANAGING TERMINAL DEVICE

(71) Applicant: Huawei Device Co., LTD, Shenzhen (CN)

(72) Inventors: Huangwei Wu, Shenzhen (CN); Zhiqin He, Shenzhen (CN); Qinliang Zhang, Shenzhen (CN); Yu Zhu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 247 days.

(21) Appl. No.: 13/908,642

(22) Filed: Jun. 3, 2013

(65) Prior Publication Data
US 2013/0268640 A1 Oct. 10, 2013

Related U.S. Application Data

(63) Continuation of application No. PCT/CN2011/083284, filed on Dec. 1, 2011.

(30) Foreign Application Priority Data

Dec. 3, 2010 (CN) .......................... 2010 1 0572353

(51) Int. Cl.
G06F 15/177 (2006.01)
H04L 12/24 (2006.01)
(Continued)

(52) U.S. Cl.
CPC .......... *H04L 41/0816* (2013.01); *H04L 12/281* (2013.01); *H04L 12/2832* (2013.01);
(Continued)

(58) Field of Classification Search
CPC ............ H04L 41/0213; H04L 41/0803; H04L 12/281; H04L 12/2832; H04L 12/4625; H04L 41/0226; H04L 41/0809; H04L 41/0813; H04L 41/0816; H04L 67/16
USPC .................................. 709/221, 224, 228, 202
See application file for complete search history.

(56) References Cited

U.S. PATENT DOCUMENTS

2008/0133717 A1* 6/2008 Bouchat et al. ............... 709/220
2008/0282268 A1 11/2008 Liekens et al.
(Continued)

FOREIGN PATENT DOCUMENTS

CN 101304335 A 11/2008
CN 101304350 A 11/2008
(Continued)

OTHER PUBLICATIONS

Broadband Forum Technical Report, TR-069 Amendment 3, CPE WAN Management Protocol, Issue 1, Nov. 2010, Protocol Version 1.2, 197 pages.
(Continued)

Primary Examiner — Benjamin M Thieu
(74) Attorney, Agent, or Firm — Slater & Matsil, L.L.P.

(57) ABSTRACT

Embodiments of the present invention disclose a method for managing a terminal device, including: obtaining a description file of a UPnP device management data model of a UPnP device in a home network, where the UPnP device management data model is organized by the UPnP device according to a data model defined by a remote management protocol; establishing a data model meeting CWMP requirements, of the UPnP device according to the description file; sending information about the data model of the UPnP device meeting the CWMP requirements to an ACS; receiving a management command of the ACS for the data model of the UPnP device; and converting the management command into a UPnP device management command and sending it to the UPnP device.

19 Claims, 4 Drawing Sheets

(51) Int. Cl.
  *H04L 12/28* (2006.01)
  *H04L 12/46* (2006.01)
  *H04L 29/08* (2006.01)

(52) U.S. Cl.
  CPC .......... *H04L12/4625* (2013.01); *H04L 41/022* (2013.01); *H04L 41/0213* (2013.01); *H04L 41/0226* (2013.01); *H04L 41/0809* (2013.01); *H04L 67/16* (2013.01)

(56) References Cited

U.S. PATENT DOCUMENTS

| | | |
|---|---|---|
| 2009/0019104 A1* | 1/2009 | Justen et al. .................. 709/202 |
| 2009/0064268 A1* | 3/2009 | Straub et al. .................. 725/152 |
| 2009/0219820 A1* | 9/2009 | Acke et al. .................... 370/241 |
| 2010/0057921 A1* | 3/2010 | Zhang et al. .................. 709/228 |
| 2010/0132000 A1* | 5/2010 | Straub et al. .................. 725/117 |
| 2011/0096728 A1* | 4/2011 | Wu et al. ........................ 370/328 |
| 2011/0113126 A1* | 5/2011 | Fang et al. .................... 709/220 |
| 2012/0166660 A1 | 6/2012 | Zhang et al. |
| 2012/0265862 A1 | 10/2012 | Fang et al. |
| 2013/0268640 A1 | 10/2013 | Wu et al. |

FOREIGN PATENT DOCUMENTS

| | | |
|---|---|---|
| CN | 101795288 A | 8/2010 |
| CN | 101800917 A | 8/2010 |
| CN | 102130937 A | 7/2011 |
| WO | WO 2010/092019 A1 | 8/2010 |

OTHER PUBLICATIONS

"Telecommunications and Internet converged Services and Protocols for Advanced Networking (TISPAN); Analysis of protocols for customer networks connected to TISPAN NGN," ETSI TR 185 007 V2.0.0, Mar. 2008, 24 pages.

Delphinanto, et al., "Remote discovery and management of end-user devices in heterogeneous private networks," Consumer Communications and Networking Conference, 6th IEEE, Jan. 10, 2009, 5 pages.

European Search Report received in Application No. 11845348.9-1853 mailed Dec. 20, 2013, 7 pages.

International Search Report received in International Application No. PCT/CN2011/083284 mailed Mar. 15, 2012, 4 pages.

Broadband Forum, TR-124, Functional Requirements for Broadband Residential Gateway Devices, Dec. 2006.

Broadband Forum, TR-135, Data Model for A TR-069 Enabled STB, Dec. 2007.

Chinese Office Action received in Application No. 201010572353.0, mailed Aug. 15, 2012, 4 pages.

Chinese Rejection Decision received in Application No. 201010572353.0, mailed Mar. 7, 2013, 5 pages.

* cited by examiner

METHOD, PROXY DEVICE, AND SYSTEM FOR MANAGING TERMINAL DEVICE

CROSS-REFERENCE TO RELATED APPLICATIONS

This application is a continuation of International Application No. PCT/CN2011/083284, filed on Dec. 1, 2011, which claims priority to Chinese Patent Application 201010572353.0, filed on Dec. 3, 2010, both of which are hereby incorporated by reference in their entireties.

TECHNICAL FIELD

The present invention relate to the communications field, and in particular, to a method, proxy device, and system for managing a terminal device.

BACKGROUND

In an existing remote proxy management architecture, an auto-configuration server (ACS) interacts with a proxy device by using a remote management protocol and a proxied device interacts with the proxy device by using a local area network protocol, where a customer premises equipment wide area network management protocol (CPE WAN Management Protocol, CWMP) defined by the Broadband Forum may be used as the remote management protocol, and the universal plug and play (UPnP) protocol may be used as the local area network protocol.

When the ACS sends a management command to a proxied device, the ACS sends the management command to the proxy device using CWMP, and the proxy device converts the management command into a local area network protocol packet and then sends it to the proxied device, thereby implementing management of the proxied device by the ACS, where the proxy device may be a home gateway, and the proxied device may be multiple UPnP devices such as a set top box, an AP (Access Point) device, and a VoIP device.

During the implementation of the present invention, the inventors find that the prior art has at least the following disadvantage: in the prior art, when a home gateway uploads data of a UPnP device to an ACS, the home gateway needs to identify and convert the data model of the UPnP device because the UPnP protocol has only one universal data model; however, when the UPnP device involves different service data, this universal data model cannot suit the service data model well, so that the home gateway cannot identify the service data model of the UPnP device, resulting in that the ACS cannot manage the UPnP device well.

SUMMARY OF THE INVENTION

Embodiments of the present invention provide a method, proxy device, and system for managing a terminal device, so that the proxy device may efficiently obtain a data model of a UPnP device, thereby improving an ACS for managing the UPnP device well.

According to one aspect of the present invention, a method for managing a terminal device is provided, including obtaining a description file of a UPnP device management data model of a UPnP device in a home network, where the UPnP device management data model is organized by the UPnP device according to a data model defined by a remote management protocol, establishing a data model meeting CWMP requirements, of the UPnP device according to the description file, sending information about the data model of the UPnP device meeting the CWMP requirements to an ACS, receiving a management command of the ACS for the data model of the UPnP device, and converting the management command into a UPnP device management command and sending it to the UPnP device.

According to another aspect of the present invention, a proxy device is further provided, including an obtaining module configured to obtain a description file of a UPnP device management data model of a UPnP device in a home network, where the UPnP device management data model is organized by the UPnP device according to a data model defined by a remote management protocol, an establishing module configured to establish a data model meeting CWMP requirements, of the UPnP device according to the description file, a sending module configured to send information about the data model of the UPnP device meeting the CWMP requirements to an ACS, a receiving module configured to receive a management command of the ACS for the data model of the UPnP device, and a converting module configured to convert the management command into a UPnP device management command, where the sending module is further configured to send the converted management command to the UPnP device.

According to another aspect of the present invention, a system for managing a terminal device is further provided, including an ACS and a proxy device, the proxy device is configured to obtain a description file of a UPnP device management data model of a UPnP device in a home network, establish a data model meeting CWMP requirements, of the UPnP device according to the description file, and send information about the data model of the UPnP device meeting the CWMP requirements to the ACS; where the UPnP device management data model is organized by the UPnP device according to a data model defined by a remote management protocol, the ACS is configured to send a management command for the data model of the UPnP device according to the information about the data model of the UPnP device meeting the CWMP requirements, and the proxy device is further configured to convert the management command into a UPnP device management command and send it to the UPnP device.

According to the technical solutions provided by the embodiment of the present invention, it is unnecessary to perform semantic conversion for a data model, and a data model of a UPnP device meeting a remote management protocol may be obtained merely according to a description file. Therefore, compared with the prior art, the present invention is capable of efficiently obtaining a data model that meets a remote management protocol and easing the burden on a proxy device; when the obtained data model meeting the remote management protocol is sent to an ACS, the ACS may manage the UPnP device more easily.

BRIEF DESCRIPTION OF THE DRAWINGS

To describe the technical solutions in the embodiment of the present invention more clearly, the following briefly introduces the accompanying drawings needed for describing the embodiment. Apparently, the accompanying drawings in the following descriptions show merely some of the embodiment of the present invention, and persons of ordinary skill in the art may still derive other drawings from the accompanying drawings without creative efforts.

DETAILED DESCRIPTION OF ILLUSTRATIVE EMBODIMENTS

The following clearly describes the technical solutions in the embodiment of the present invention with reference to the accompanying drawings in the embodiment of the present invention. Apparently, the described embodiments are merely a part rather than all of the embodiment of the present invention. All other embodiments obtained by persons of ordinary skill in the art based on the embodiment of the present invention without creative efforts shall fall within the protection scope of the present invention.

It is obvious that the described embodiments are merely a part rather than all of the embodiment of the present invention. All other embodiments obtained by persons of ordinary skill in the art based on the embodiment of the present invention without creative efforts shall fall within the protection scope of the present invention.

In the embodiment, a UPnP device may organize a UPnP device management data model of the device itself according to a data model defined by a remote management protocol. In the embodiment, UPnP devices may be classified into a set top box (STB), an AP (Access Point, Access Point) device, and a VoIP device. Therefore, in the embodiment, a set top box may organize a UPnP device management data model of the device itself according to the BBF TR-135 standard, that is, organize, according to the BBF TR-135 standard, a set top box UPnP device management data model defined by the standard; the VoIP device may organize data model of the device itself according to BBF TR-124 standard, that is, organize, according to BBF TR-124, a VoIP UPnP device management data model defined by the standard.

In the embodiment, the UPnP device may organize the UPnP device management data model of the device itself according to the device service data model defined by the remote management protocol, where different protocol formats may be used to describe the organized UPnP device management data model of the device itself. In the embodiment, a format defined by the remote management protocol may be used to describe the organized UPnP device management data model of the device itself. It may be understood that, for a set top box device, a format defined by BBF TR-135 may be used to describe a data model; for a VoIP device, a format defined by BBF TR-124 may be used to describe a data model; and a UPnP DM format in the UPnP protocol may also be used to describe the organized UPnP device management data model of the device itself for the set top box or VoIP device.

The remote management protocol may be a CWMP protocol defined by the BBF or an Open Mobile Alliance OMA DM device management protocol.

Figure 1:
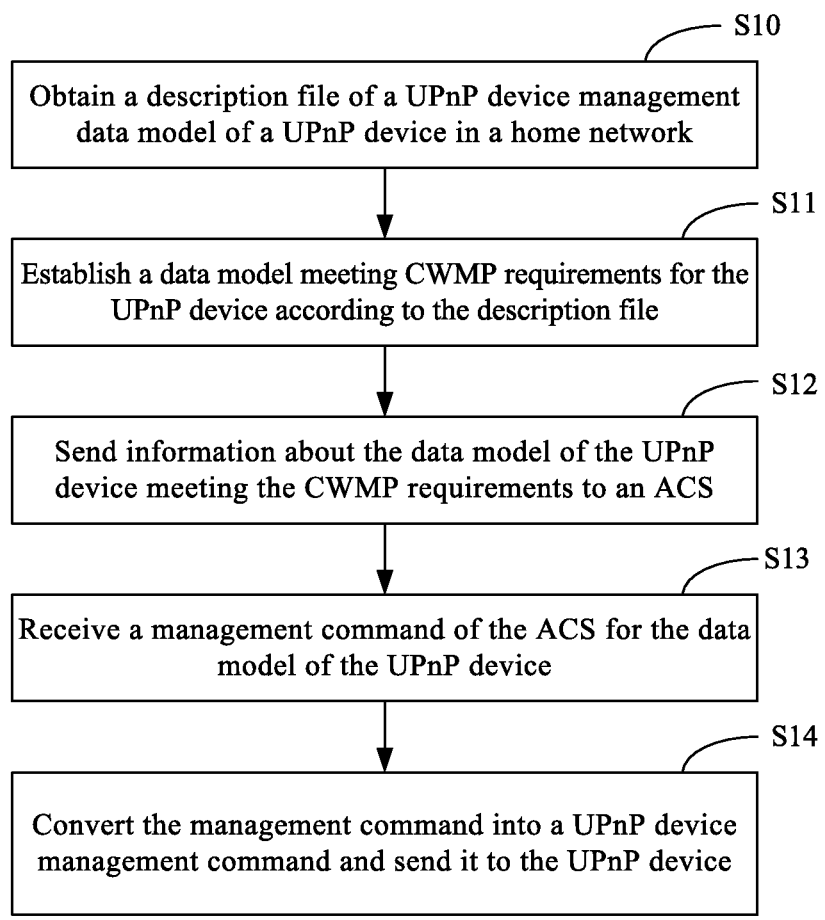
FIG. 1 is an overall flowchart of a method for managing a terminal device according to an embodiment of the present invention.

FIG. 1 is an overall flowchart of a method for managing a terminal device according to an embodiment of the present invention.

Step S10: Obtain a description file of a UPnP device management data model of a UPnP device in a home network, where the UPnP device management data model is organized by the UPnP device according to a data model defined by a remote management protocol.

Step S11: Establish a data model meeting CWMP requirements, of the UPnP device according to the description file.

Step S12: Send information about the data model of the UPnP device meeting the CWMP requirements to an ACS.

Step S13: Receive a management command of the ACS for the data model of the UPnP device.

Step S14: Convert the management command into a UPnP device management command and send it to the UPnP device.

In the embodiment, a UPnP device organizes a UPnP device management data model of the device itself according to a data model defined by a remote management protocol, a description file of the data model of the UPnP device is obtained, the data model of the UPnP device meeting CWMP requirements is obtained according to the description file, where it is unnecessary to perform semantic conversion for the data model and the data model of the UPnP device meeting the remote management protocol may be obtained merely according to the description file. Therefore, compared with the prior art, the present invention is capable of efficiently obtaining a data model that meets a remote management protocol and easing the burden on a proxy device; when the obtained data model meeting the remote management protocol is sent to an ACS, the ACS may manage the UPnP device more easily.

For better understanding, the following embodiments are used for description.

Figure 2:
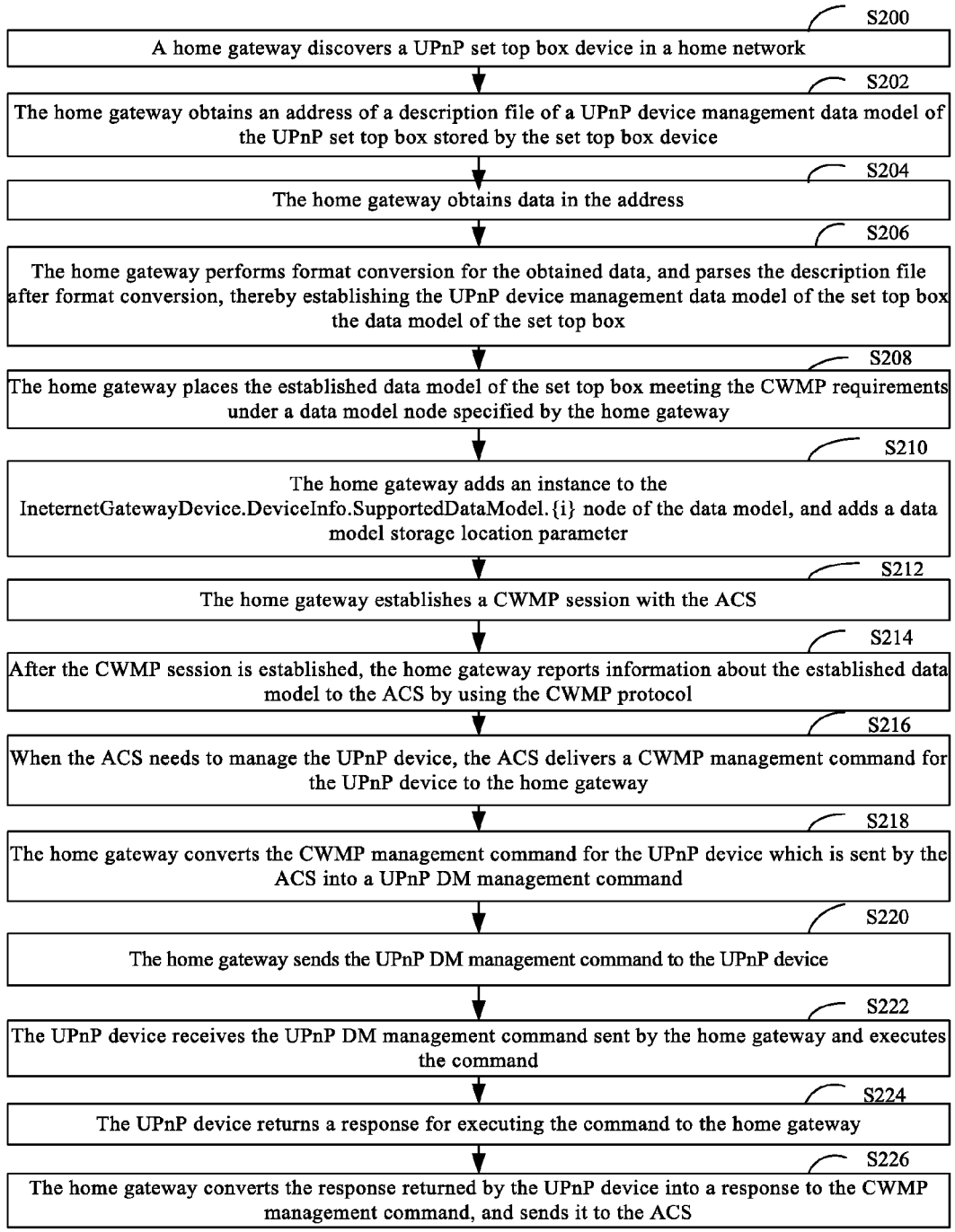
FIG. 2 is a first specific flowchart of a method for managing a terminal device according to an embodiment of the present invention.

FIG. 2 is a first specific flowchart of a method for managing a terminal device according to an embodiment of the present invention.

For the convenience of description, the embodiment is described by using a home gateway as a proxy device, and a UPnP device set top box as a proxied device for illustration. No limitation is set thereto, and the implementation may be performed for other devices with reference to the method.

In the embodiment, a set top box organizes a UPnP device management data model of the set top box according to a data model defined by the BBF TR-135 standard.

Step S200: A home gateway discovers a UPnP set top box device in a home network.

Step S202: The home gateway obtains an address of a description file of a UPnP device management data model of the UPnP set top box, where the address is stored by the set top box device. In the embodiment, before the set top box is delivered from a factory, a UPnP device management data model of the set top box constructed and organized according to BBF TR-135,and a description file of the data model may be set in advance in the set top box. In the embodiment, the description file is described by using a UPnP DM format in the UPnP protocol. Therefore, the home gateway, when discovering a UPnP set top box device, needs to obtain the stored address of the description file of the UPnP device management data model of the UPnP set top box, thereby finally obtaining data in the address.

Step S204: The home gateway obtains data in the address. In the embodiment, the home gateway sends a GET request to the address of the description file of the UPnP device management data model of the UPnP set top box, and receives the description file of the UPnP device management data model of the UPnP set top box. In the embodiment, the home gateway sends an HTTP-GET GET request to the address of the description file of the UPnP device management data model of the UPnP set top box.

Step S206: The home gateway performs format conversion for the obtained data, and parses the description file after format conversion, thereby establishing the UPnP device management data model of the set top box. In the embodiment, because the description file of the UPnP device management data model of the set top box is described by using a UPnP DM format in the UPnP protocol, the home gateway needs to convert the UPnP DM format into a format defined by the remote management protocol. In the embodiment, the UPnP DM format may be converted into a format defined by CWMP. Certainly, different settings may be made according to actual requirements.

In the embodiment, for example, a "/" character of information describing a path of a parameter in the UPnP DM format may be converted into a "." character in the format defined by CWMP, and types of parameters may be converted according to a mapping relationship, etc. In the embodiment, because the UPnP device management data model itself in the set top box device is constructed and organized according to the remote management protocol, but the description file is described according to the UPnP DM format, the data model itself does not need to be converted, and only the format of the description file needs to be converted. After the format conversion, the description file is parsed according to CWMP, and thereby a data model meeting CWMP requirements, of the UPnP device is established. In this step, the description file may be parsed according to CWMP to establish the data model of the set top box meeting the CWMP requirements.

Step S208: The home gateway places the established data model of the set top box meeting the CWMP requirements under a data model node specified by the home gateway. In the embodiment, because the home gateway may act as a proxy to manage multiple UPnP devices, different UPnP devices have different numbers under the management of the home gateway. That is, in this step, if the set top box is a first UPnP device discovered by the home gateway, the established data model of the set top box meeting the CWMP requirements may be placed under the InternetGatewayDevice. Service. ProxiedDevices.1 node according to the following description.

Step S210: The home gateway adds an instance to the InternetGatewayDevice. DeviceInfo. SupportedDataModel.{i} node of the data model, and adds a data model storage location parameter. In the embodiment, the data model storage location parameter may be understood as a location parameter. This parameter describes a location, which is for storing the data model described by the data model description file and is pointed to by a URL parameter in the data model of the home gateway, where the URL parameter provides a link pointing to a location where the converted description file of the data model of the UPnP set top box device is stored, so that the ACS may send an HTTP-GET command to the URL to obtain the data model description file.

Step S212: The home gateway establishes a CWMP session with the ACS.

Step S214: After the CWMP session is established, the home gateway reports information about the established data model to the ACS by using the CWMP protocol. In the embodiment, the home gateway reports information about the data model of the UPnP set top box meeting the CWMP requirements to the ACS by using the CWMP protocol. In the embodiment, the home gateway generates a description file from the established data model of the UPnP device meeting the CWMP requirements by using the format defined by the remote management protocol, and sends the address of the description file to the ACS. In the embodiment, information about the data model of the UPnP set top box meeting the CWMP requirements refers to the address of the description file.

Step S216: When the ACS needs to manage the UPnP device, the ACS delivers a CWMP management command for the UPnP device to the home gateway. In the embodiment, when the ACS needs to manage the UPnP set top box device, the ACS delivers the CWMP management command for the UPnP set top box data model in the home gateway data model according to the obtained data model information of the UPnP set top box device. In the embodiment, for example, if the ACS needs to set a value of a parameter IneternetGatewayDevice. Service. ProxiedDevices.1. STBService.1. Capabilities. CDS. PushCapable, which is for mapping the UPnP set top box in the home gateway data model, to TRUE, the ACS needs to send a SetParameterValues management command in the CWMP protocol to the home gateway, where the command carries a path of the parameter to be set IneternetGatewayDevice. Service. ProxiedDevices.1. STBService.1. Capabilities. CDS. PushCapable and the value to be set TRUE.

Step S218: The home gateway converts the CWMP management command for the UPnP device which is sent by the ACS into a UPnP DM management command. In the embodiment, because the data model is not changed, the home gateway only needs to convert the CWMP management command into the UPnP DM management command, which includes removing the information about the storage location in the path information of the data model parameter in the CWMP management command, and changing the "." character in the remaining part into the character "/". In the embodiment, for example, in this step, the home gateway, after receiving the SetParameterValues management command sent by the ACS, removes information about the UPnP STB data model storage location IneternetGatewayDevice. Service. ProxiedDevices.1 from the parameter IneternetGatewayDevice. Service. ProxiedDevices.1. STBService.1. Capabilities. CDS. PushCapable first; then, changes the "." character in the remaining part into the character "/"; and finally obtains corresponding path information /STBService/1/Capabilities/CDS/PushCapable of the data model parameter of the UPnP STB device, changes the management command into SetValues in UPnP DM, which carries the parameter to be set /STBService/1/Capabilities/CDS/PushCapable and the value to be set TRUE.

Step S220: The home gateway sends the UPnP DM management command to the UPnP device. In this embodiment, the home gateway sends the UPnP DM management command to the UPnP STB device.

Step S222: The UPnP device receives the UPnP DM management command sent by the home gateway and executes the command. In this embodiment, the UPnP STB device receives the UPnP DM management command sent by the home gateway and executes the command.

Step S224: The UPnP device returns a response for executing the command to the home gateway. In this embodiment, the UPnP STB device returns a response for executing the UPnP DM management command to the home gateway.

Step S226: The home gateway converts the response returned by the UPnP device into a response to the CWMP management command, and sends it to the ACS.

In this embodiment, because a UPnP device organizes a UPnP device management data model of the device itself according to a device service data model defined by a remote management protocol, a home gateway may merely convert a description format of a description file of the data model, and then parse the description file after format conversion according to a standard defined by the remote management protocol, so as to identify and obtain a data model of the UPnP device meeting CWMP requirements. It is unnecessary to perform semantic conversion for the data model, and the data model of the UPnP device meeting the remote management protocol may be obtained merely by parsing the description file according to the remote management protocol. Therefore, compared with the prior art, the present invention is capable of efficiently obtaining a data model that meets a remote management protocol and easing the burden on a proxy device; when the obtained data model meeting the remote management protocol is sent to an ACS, the ACS may manage the UPnP device more easily.

Figure 3:
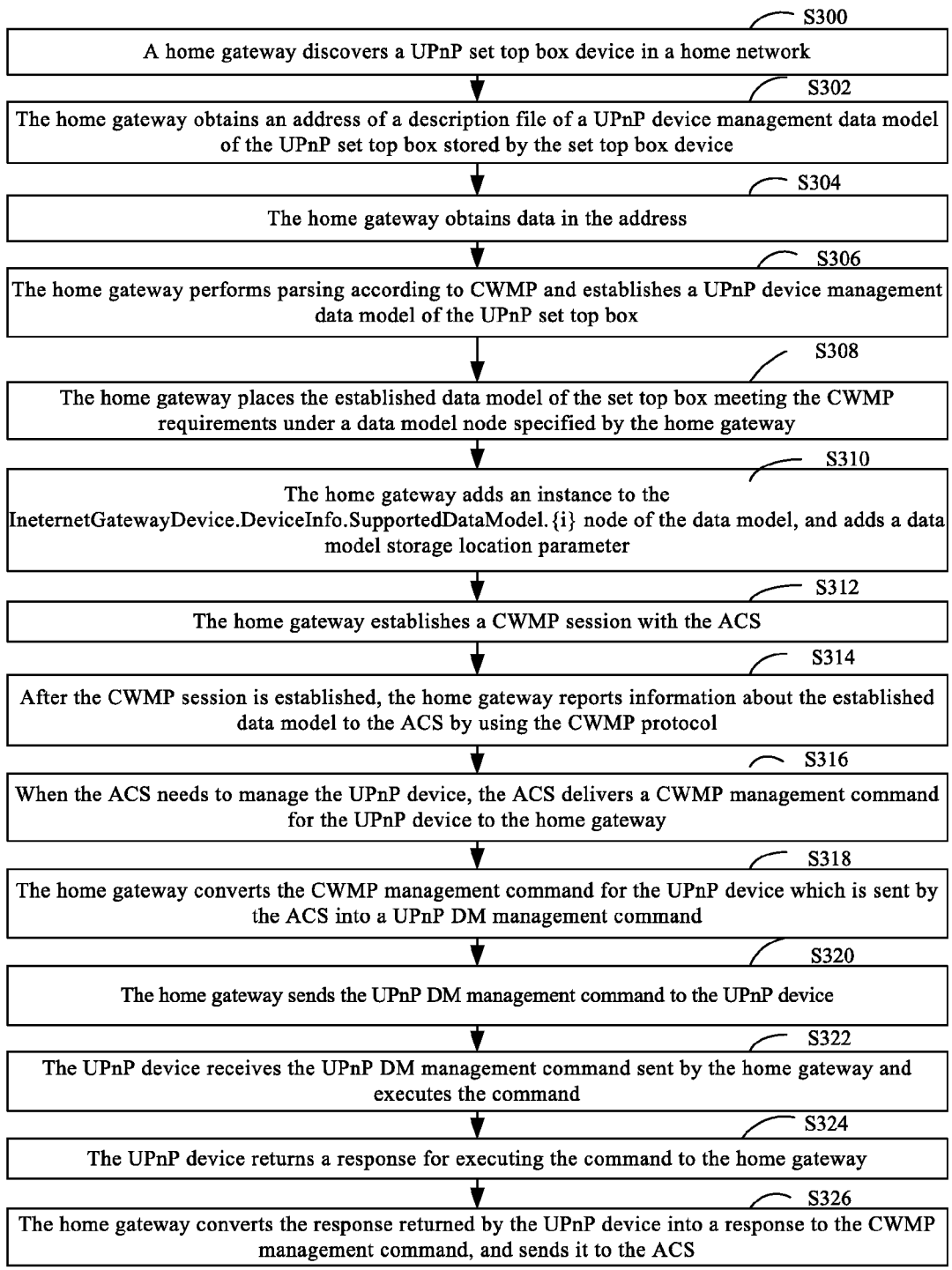
FIG. 3 is a second specific flowchart of a method for managing a terminal device according to an embodiment of the present invention.

FIG. 3 is a second specific flowchart of a method for managing a terminal device according to an embodiment of the present invention.

For the convenience of description, the embodiment is described by using a home gateway as a proxy device, and a UPnP device set top box as a proxied device for illustration. No limitation is set thereto, and the implementation may be performed for other devices with reference to the method.

In the embodiment, a set top box organizes a UPnP device management data model of the set top box according to a data model defined by the BBF TR-135 standard.

Step S300: A home gateway discovers a UPnP set top box device in a home network.

Step S302: The home gateway obtains an address of a description file of a UPnP device management data model of the UPnP set top box, where the address is stored by the set top box device. In the embodiment, before the set top box is delivered from the factory, a UPnP device management data model of the set top box organized according to BBF TR-135, and a description file of the data model may be set in advance in the set top box. In the embodiment, the description file is described by using a format defined by CWMP. Therefore, the home gateway, when discovering a UPnP set top box device, needs to obtain the stored address of the description file of the UPnP device management data model of the UPnP set top box, thereby finally obtaining data in the address.

Step S304: The home gateway obtains data in the address. In the embodiment, the home gateway sends a GET request to the address of the description file of the UPnP device management data model of the UPnP set top box, and receives the description file of the UPnP device management data model of the UPnP set top box. In the embodiment, the home gateway sends an HTTP-GET GET request to the address of the description file of the UPnP device management data model of the UPnP set top box.

Step S306: The home gateway performs parsing according to CWMP and establishes a UPnP device management data model of the UPnP set top box. In this embodiment, according to the remote management protocol, the home gateway parses the data obtained from the set top box, thereby obtaining the UPnP device management data model of the UPnP set top box. Because the data model itself in the set top box is organized according to CWMP, and the description file is described by using the CWMP-defined format, only the description file needs to be parsed according to CWMP to conveniently establish a data model of the UPnP device meeting CWMP requirements. In this embodiment, the description file may be parsed according to CWMP to establish a data model of the UPnP set top box meeting CWMP requirements.

Step S308: The home gateway places the established data model of the set top box meeting the CWMP requirements under a data model node specified by the home gateway. In this embodiment, because the home gateway may act as a proxy to manage multiple UPnP devices, different UPnP devices have different numbers under the management of the home gateway. That is, in this step, if the set top box is a first UPnP device, the established data model of the set top box meeting the CWMP requirements may be placed under the InternetGatewayDevice. Service. ProxiedDevices.1 node according to the following description.

Step S310: The home gateway adds an instance to the InetemetGatewayDevice. DeviceInfo. SupportedDataModel.{i} node of the data model, and adds a data model storage location parameter. In the embodiment, the data model storage location parameter may be understood as a location parameter. This parameter describes a location, which is for storing the data model described by the data model description file and is pointed to by a URL parameter in the data model of the home gateway, where the URL parameter provides a link pointing to a location where the converted description file of the data model of the UPnP set top box device is stored, so that the ACS may send an HTTP-GET command to the URL to obtain the data model description file.

Step S312: The home gateway establishes a CWMP session with the ACS.

Step S314: After the CWMP session is established, the home gateway reports information about the established data model to the ACS by using the CWMP protocol. In the embodiment, the home gateway reports information about the data model of the UPnP set top box to the ACS by using the CWMP protocol.

Step S316: When the ACS needs to manage the UPnP device, the ACS delivers a CWMP management command for the UPnP device to the home gateway. In the embodiment, when the ACS needs to manage the UPnP set top box device, the ACS delivers the CWMP management command for the UPnP set top box data model in the home gateway data model according to the obtained data model information of the UPnP STB device. In the embodiment, for example, if the ACS needs to set a value of a parameter InetemetGatewayDevice. Service. ProxiedDevices.1. STBService.1. Capabilities. CDS. PushCapable, which is for mapping the UPnP STP in the home gateway data model, to TRUE, the ACS needs to send a SetParameterValues management command in the CWMP protocol to the home gateway, where the command carries a path of the parameter to be set InetemetGatewayDevice. Service. ProxiedDevices.1. STBService.1. Capabilities. CDS. PushCapable and the value to be set TRUE.

Step S318: The home gateway converts the CWMP management command for the UPnP device which is sent by the ACS into a UPnP DM management command. In this embodiment, because the data model is not changed, the home gateway only needs to convert the CWMP management command into the UPnP DM management command, which includes removing the information about the storage location in the path information of the data model parameter in the CWMP management command, and changing the "." character in the remaining part into character "/". For example, after the SetParameterValues management command sent by the ACS in step S316 is received, information about the UPnP STB data model storage location InetemetGatewayDevice. Service. ProxiedDevices.1 is removed from the parameter InetemetGatewayDevice. Service. ProxiedDevices.1. STBService.1. Capabilities. CDS. PushCapable first; then, the "." character in the remaining part is changed into the character "/"; and finally corresponding path information /STBService/1/Capabilities/CDS/PushCapable of the data model parameter of the UPnP STB device is obtained, and the management command is changed into SetValues in UPnP DM, which carries the parameter to be set /STBService/1/Capabilities/CDS/PushCapable and the value to be set TRUE.

Step S320: The home gateway sends the UPnP DM management command to the UPnP device. In this embodiment, the home gateway sends the UPnP DM management command to the UPnP STB device.

Step S322: The UPnP device receives the UPnP DM management command sent by the home gateway and executes the command. In this embodiment, the UPnP STB device receives the UPnP DM management command sent by the home gateway and executes the command.

Step S324: The UPnP device returns a response for executing the command to the home gateway. In this embodiment, the UPnP STB device returns a response for executing the UPnP DM management command to the home gateway.

Step S326: The home gateway converts the response returned by the UPnP device into a response to the CWMP management command, and sends it to the ACS.

In this embodiment, because a UPnP device organizes a UPnP device management data model of the device itself according to a device service data model defined by a remote management protocol, and describes a description file of the data model according to a format defined by the remote management protocol, a home gateway may merely parse, according to the remote management protocol, the description file obtained from the UPnP device, so as to obtain a data model of the UPnP device meeting CWMP requirements. It is unnecessary to perform semantic conversion for the data model, and the data model of the UPnP device meeting the remote management protocol may be obtained merely by parsing the description file according to the remote management protocol. Therefore, compared with the prior art, the present invention is capable of efficiently obtaining a data model that meets a remote management protocol and easing the burden on a proxy device; when the obtained data model meeting the remote management protocol is sent to an ACS, the ACS may manage the UPnP device more easily.

Figure 4:
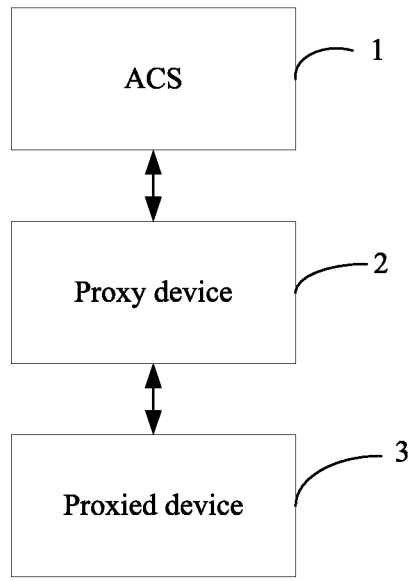
FIG. 4 is a structural diagram of a system for managing a terminal device according to an embodiment of the present invention.

FIG. 4 is a structural diagram of a system for managing a terminal device according to an embodiment of the present invention.

In this embodiment, an ACS 1 is in a communication connection with a proxy device 2, and the proxy device 2 is in a communication connection with a proxied device 3, where the proxied device 3 may include multiple sub-proxied devices. In this embodiment, the proxy device 2 may be a home gateway, the proxied device may be a UPnP device, and the sub-proxied device may be a set top box (Set Top Box, STB), an AP (Access Point, Access Point) device, a VoIP (Voice Over Internet Protocol, Voice Over Internet Protocol) device, or a digital media player (Digital Media Player, DMP). Certainly, persons skilled in the art may add other devices or reduce devices according to actual requirements. The present invention sets no limitation thereto.

In this embodiment, the proxy device 2 may communicate with the ACS 1 by using a remote management protocol. In this embodiment, the remote management protocol is exemplified by using the CWMP protocol. The proxy device 2 may communicate with the proxied device 3 by using a local area network protocol. In this embodiment, the UPnP protocol may be used for communication.

In this embodiment, a sub-proxied device in the proxied device 3 may organize a UPnP device management data model of the device itself according to a service data model of the device defined in the CWMP protocol. For example, a set top box may organize the data model of the device itself according to BBF TR-135, that is, organize, according to BBF TR-135, a set top box data model defined by the standard; a VoIP device may organize the data model of the device itself according to BBF TR-124, that is, organize, according to BBF TR-124, a VoIP data model defined by the standard.

Meanwhile, in this embodiment, a sub-proxied device in the proxied device 3 may also organize the UPnP device management data model of the device itself according to the device service data model defined by the remote management protocol, where different protocol formats may be used to describe the organized UPnP device management data model of the device itself. In the embodiment, a format defined by the remote management protocol may be used to describe the organized UPnP device management data model of the device itself. It may be understood that, for a set top box device, a format defined by BBF TR-135 may be used to describe a data model; for a VoIP device, a format defined by BBF TR-124 may be used to describe a data model; and for the set top box or VoIP device, a UPnP DM format in the UPnP protocol may also be used to describe the organized UPnP device management data model of the device itself.

In this embodiment, the proxy device 2 is configured to obtain the data model information of the proxied device 3 organized according to the device service data model defined by the remote management protocol, and send the obtained data model information to the ACS 1.

The ACS 1 is configured to receive the data model information of the proxied device 3 sent by the proxy device 2, and when it is necessary to manage the proxied device 3, send a CWMP management command for the proxied device 3 to the proxy device 2 according to the data model information of the proxied device 3.

The proxy device 2 is further configured to convert the CWMP command sent by the ACS 1 into a UPnP DM management command, and send it to the proxied device 3, so that the proxied device 3 executes the command.

In this embodiment, because a proxied device organizes a UPnP device management data model of the device itself according to a device service data model defined by a remote management protocol, it is unnecessary for a home gateway to perform model conversion for a data model of a UPnP device, thereby easing the burden on the home gateway.

Figure 5:
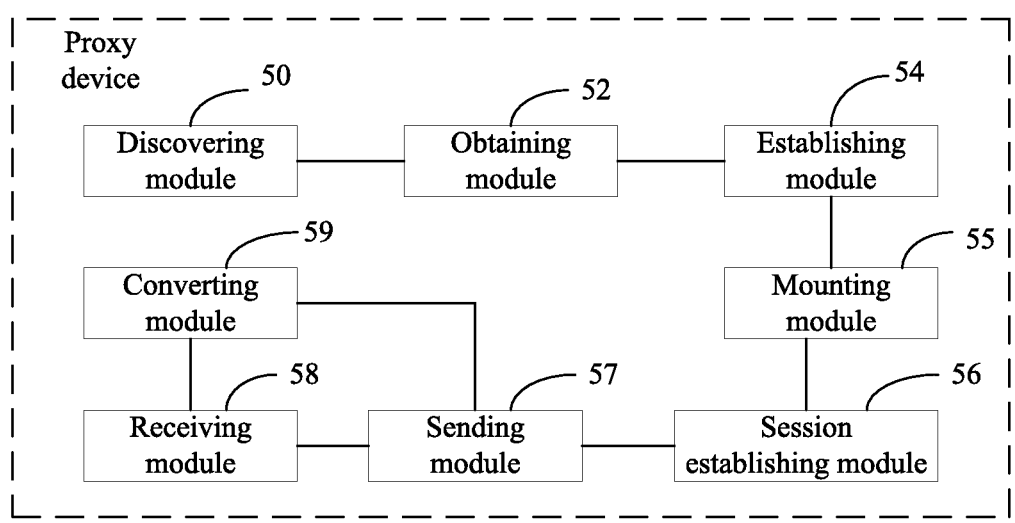
FIG. 5 is a structural diagram of a proxy device according to an embodiment of the present invention.

FIG. 5 is a structural diagram of a proxy device according to an embodiment of the present invention.

In this embodiment, a proxy device includes a discovering module 50, an obtaining module 52, an establishing module 54, a mounting module 55, a session establishing module 56, a sending module 57, a receiving module 58, and a converting module 59.

In this embodiment, the discovering module 50 is configured to discover a proxied device. In this embodiment, the proxied device is exemplified by using a UPnP set top box device, which is not limited here. In this embodiment, the discovering module 50 is further configured to discover a UPnP set top box device in a home network.

The obtaining module 52 is configured to obtain a description file of a UPnP device management data model of a UPnP device in a home network, where the UPnP device management data model is organized by the UPnP device according to a data model defined by a remote management protocol. In this embodiment, the obtaining module 52 is further configured to obtain an address of a data model stored by the proxied device. In this embodiment, the obtaining module 52 further obtains an address used by the set top box device for storing a UPnP device management data model of the UPnP set top box. In the embodiment, before the set top box is delivered from the factory, a UPnP device management data model of the set top box organized according to BBF TR-135 may be set and generated in advance in the set top box, and a description file of the data model may be generated. Certainly, the description file is included in the data model. In this embodiment, the description file is described by using a UPnP DM format in the UPnP protocol. Therefore, the home gateway, when discovering a UPnP set top box device, needs to obtain an address for storing the UPnP device management data model of the UPnP set top box, thereby finally obtaining data in the address.

In this embodiment, the obtaining module 52 is further configured to send a GET request to the address of the UPnP device management data model of the UPnP set top box, and receive data in the address of the UPnP device management data model of the UPnP set top box returned by the UPnP set top box. In this embodiment, the data in the address of the UPnP device management data model of the UPnP set top box is the description file of the data model. The home gateway obtains the data in the address by sending an HTTP-GET GET request to the address of the UPnP device management data model of the UPnP set top box.

The establishing module 54 is configured to establish a data model meeting CWMP requirements, of the UPnP device according to the description file. In this embodiment, the establishing module 54 parses the description file according to CWMP to establish a data model meeting CWMP requirements, of the UPnP device.

In this embodiment, because the proxied device may describe the organized UPnP device management data model of the device itself by using different protocol formats, when the proxied device describes the organized UPnP device management data model of the device itself by using a format defined by a remote management protocol, that is, the obtained description file is described by using a format defined by a remote management protocol, the establishing module 54 directly parses the obtained description file according to the remote management protocol, thereby obtaining the data model of the proxied device.

When the proxied device describes the established UPnP device management data model of the device itself by using a UPnP DM format in the UPnP protocol, that is, the obtained description file is described by using the UPnP DM format in the UPnP protocol, the establishing module 54 needs to convert the format of the obtained description file first, and then parse the description file according to CWMP, thereby establishing a data model meeting CWMP requirements, of the UPnP device.

The mounting module 55 is configured to mount the obtained data model of the proxied device meeting the CWMP requirements under a data model node specified by the proxy device. In the embodiment, because the home gateway may act as a proxy to manage multiple UPnP devices, different UPnP devices have different numbers under the management of the home gateway. That is, in this step, if the set top box is a first UPnP device discovered by the home gateway, the established data model of the set top box the data model of the set top box meeting the CWMP requirements may be placed under the InternetGatewayDevice. Service. ProxiedDevices.1 node according to the following description. In this embodiment, the mounting module 55 may add an instance to the IneternetGatewayDevice. DeviceInfo. SupportedDataModel.{i} node, and add a data model storage location parameter. In the embodiment, the data model storage location parameter may be understood as a location parameter. This parameter describes a location, which is for storing the data model described by the data model description file and is pointed to by a URL parameter in the data model of the home gateway, where the URL parameter provides a link pointing to a location where the converted description file of the data model of the UPnP set top box device is stored, so that the ACS may send an HTTP-GET command to the URL to obtain the data model description file.

The session establishing module 56 is configured to establish a session with the ACS. In this embodiment, the session establishing module 56 may establish a CWMP session with the ACS.

The sending module 57 is configured to report the obtained data model to the ACS after a session is established. In the embodiment, the sending module 57 reports information about the device data model of the UPnP set top box meeting the CWMP requirements to the ACS by using the CWMP protocol.

The receiving module 58 is configured to receive a management command of the ACS for the proxied device. In this embodiment, the receiving module 58 receives a CWMP management command of the ACS for the proxied device.

The converting module 59 is configured to convert the received management command into a UPnP DM management command.

The sending module 57 is further configured to send the UPnP DM management command to the proxied device, so that the proxied device executes the command.

The receiving module 58 is further configured to receive a response returned when the proxied device executes the UPnP DM management command, and the sending module 57 is further configured to send the response to the ACS.

In this embodiment, because a UPnP device organizes a UPnP device management data model of the device itself according to a device service data model defined by a remote management protocol, a proxy device may parse a description file of the data model according to a standard defined by the remote management protocol, so as to obtain a data model of the UPnP device meeting CWMP requirements. It is unnecessary to perform semantic conversion for the data model, and the data model of the UPnP device meeting the remote management protocol may be obtained merely by parsing the description file according to the remote management protocol. Therefore, compared with the prior art, the present invention is capable of efficiently obtaining a data model that meets a remote management protocol and easing the burden on a proxy device; when the obtained data model meeting the remote management protocol is sent to an ACS, the ACS may manage the UPnP device more easily.

The sequence numbers of the above embodiments of the present invention are used merely for description, and do not represent the preference of the embodiment.

Persons skilled in the art may understand clearly that the embodiment of the present invention may be implemented through software and an essential universal hardware platform. Base on such an understanding, the technical solutions in the embodiment of the present invention essentially, or the part contributing to the prior art may be implemented in the form of a software product. The computer software product may be stored in a storage medium such as an ROM/RAM, a magnetic disk, or an optical disk, and include several instructions for instructing a computer device (which may be a personal computer, a server, or a network device) to perform the methods described in the embodiment of the present invention or in some parts of the embodiment of the present invention.

The foregoing embodiments are not intended to limit the present invention. For persons of ordinary skill in the art, any modification, equivalent replacement, and improvement made without departing from the principle of the present invention shall fall within the protection scope of the present invention.

What is claimed is:

1. A method for managing a terminal device, the method comprising:
   obtaining a description file of a universal plug and play (UPnP) device management data model of a UPnP device in a home network, wherein the UPnP device management data model is organized by the UPnP device according to a data model format defined by a remote management protocol;
   establishing a data model meeting customer premises equipment wide area network management protocol (CWMP) requirements of the UPnP device according to the description file;
   sending information about the data model of the UPnP device meeting the CWMP requirements to an auto-configuration server (ACS);
   receiving a management command of the ACS for the data model of the UPnP device; and
   converting the management command into a UPnP device management command and sending it to the UPnP device.

2. The method according to claim 1, wherein obtaining the description file comprises:
   discovering the UPnP device in the home network;
   obtaining an address of the description file of the data model that is organized by the UPnP device in the home network according to the remote management protocol; and
   obtaining the description file by sending a GET request to the address.

3. The method according to claim 1, wherein the description file is described by using a format defined by the remote management protocol.

4. The method according to claim 3, wherein establishing the data model of the UPnP device according to the description file comprises parsing the description file according to the format defined by the remote management protocol and establishing the data model of the UPnP device.

5. The method according to claim 1, wherein the description file is described by using a UPnP device management format defined by a UPnP protocol.

6. The method according to claim 5, wherein establishing the data model of the UPnP device according to the description file comprises:
   converting the UPnP device management format into the format defined by the remote management protocol; and
   parsing the description file after format conversion according to the format defined by the remote management protocol, and establishing the data model of the UPnP device.

7. The method according to claim 1, wherein sending the information about the data model of the UPnP device to the ACS comprises generating a further description file from the established data model of the UPnP device using a format defined by the remote management protocol and sending an address of the description file to the ACS.

8. A proxy device, comprising:
   a processor;
   a non-transitory computer-readable medium storing a program to be executed by the processor, the program including instructions for:
   obtaining a description file of a universal plug and play (UPnP) device management data model of a UPnP device in a home network, wherein the UPnP device management data model is organized by the UPnP device according to a data model format defined by a remote management protocol;
   establishing a data model meeting customer premises equipment wide area network management protocol (CWMP) requirements of the UPnP device according to the description file;
   sending information about the data model of the UPnP device meeting the CWMP requirements to an auto-configuration server (ACS);
   receiving a management command of the ACS for the data model of the UPnP device;
   converting the management command into a UPnP device management command; and
   sending the converted management command to the UPnP device.

9. The proxy device according to claim 8, wherein the program further includes instructions for:
   discovering the UPnP device in the home network; and
   obtaining an address of the description file of the data model which is organized by the UPnP device in the home network according to the remote management protocol and to obtain the description file by sending a GET request to the address.

10. The proxy device according to claim 8, wherein the description file is described by using a format defined by the remote management protocol.

11. The proxy device according to claim 10, wherein the program further includes instructions for parsing the description file according to the format defined by the remote management protocol to establish the data model of the UPnP device.

12. The proxy device according to claim 8, wherein the description file is described by using a UPnP device management format defined by a UPnP protocol.

13. The proxy device according to claim 12, wherein the program further includes instructions for converting the UPnP device management format into the format defined by the remote management protocol and parsing the description file after format conversion according to the format defined by the remote management protocol to establish the data model of the UPnP device.

14. The proxy device according to claim 8, wherein the program further includes instructions for generating generate a further description file from the established data model of the UPnP device using a format defined by the remote management protocol and sending an address of the description file to the ACS.

15. A system for managing a terminal device, comprising:
   an auto-configuration server (ACS); and
   a proxy device;
   wherein the proxy device is configured to obtain a description file of a universal plug and play (UPnP) device management data model of a UPnP device in a home network, to establish a data model meeting customer premises equipment wide area network management protocol (CWMP) requirements of the UPnP device according to the description file, and to send information about the data model of the UPnP device meeting the CWMP requirements to the ACS, wherein the UPnP device management data model is organized by the UPnP device according to a data model format defined by a remote management protocol;
   wherein the ACS is configured to send a management command for the data model of the UPnP device according to the information about the data model of the UPnP device meeting the CWMP requirements; and wherein the proxy device is further configured to convert the management command into a UPnP device management command and send it to the UPnP device.

16. The system according to claim 15, wherein the description file is described by using a format defined by the remote management protocol.

17. The system according to claim 16, wherein the proxy device is further configured to parse the description file according to the format defined by the remote management protocol to establish the data model of the UPnP device.

18. The system according to claim 15, wherein the description file is described by using a UPnP device management format defined by a UPnP protocol.

19. The system according to claim 18, wherein the proxy device is further configured to convert the UPnP device management format into the format defined by the remote management protocol and to parse the description file after format conversion according to the format defined by the remote management protocol to establish the data model of the UPnP device.

* * * * *